Sept. 1, 1953 C. J. DALLEY 2,650,845
FASTENING DEVICE
Filed Jan. 31, 1948 2 Sheets-Sheet 1
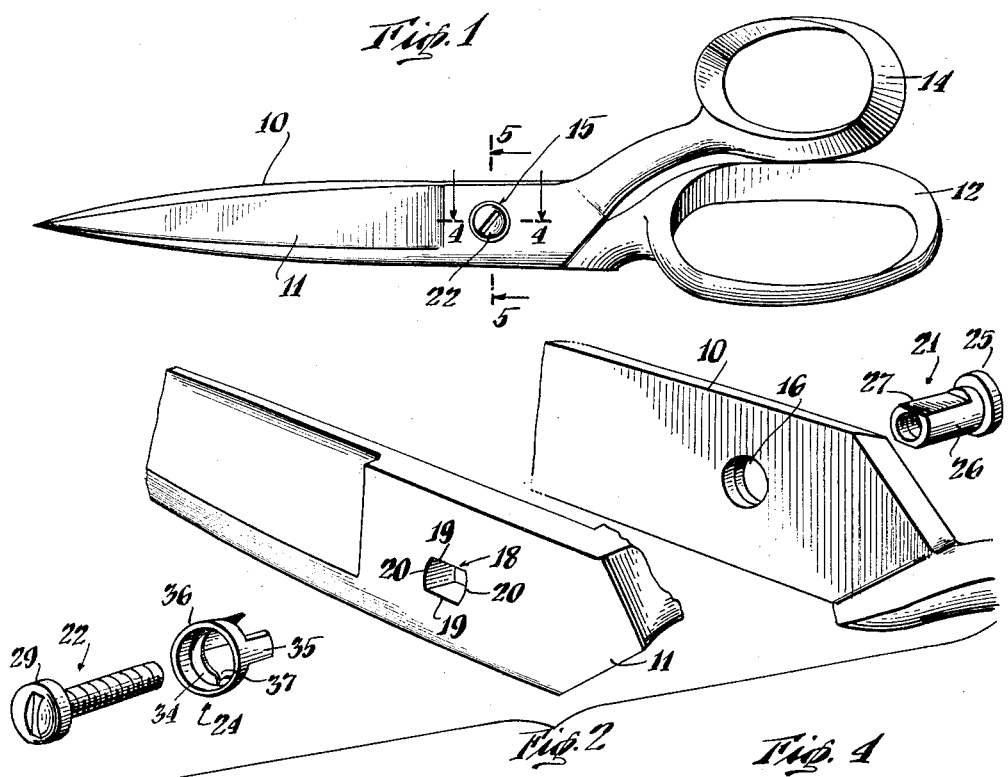

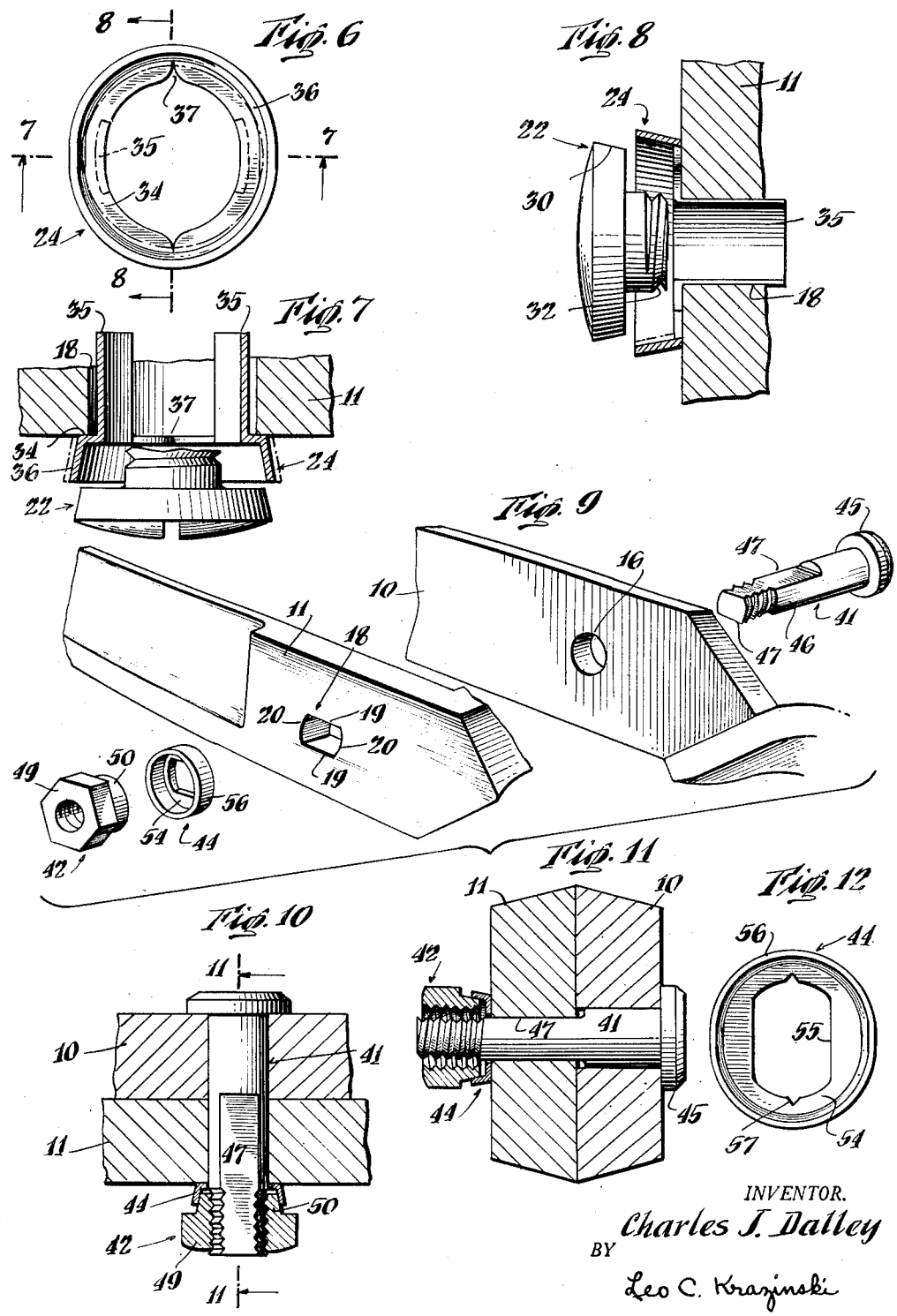

Patented Sept. 1, 1953

2,650,845

UNITED STATES PATENT OFFICE 2,650,845

FASTENING DEVICE

Charles J. Dalley, Maplewood, N. J., assignor to William Langbein, Emil Langbein, and Charles Langbein, a partnership doing business as Wm. Langbein & Bros., New York, N. Y.

Application January 31, 1948, Serial No. 5,670

1 Claim. (Cl. 287—101)

The present invention relates to fastening devices applicable as the blade mounting and tensioning means of cutting shears and the like, and more particularly relates to improvements upon the fastening members disclosed in my co-pending United States patent application, Serial Number 769,701, filed August 20, 1947, now patent No. 2,524,652.

In the aforementioned co-pending application, fastening members are illustrated which generally comprise a bolt head or nut having a cylindrical surface and an annular member having an elliptical surface of such shape to cooperate with the cylindrical surface to lock the bolt head or nut against rotation.

The present invention aims to further improve this locking action.

Accordingly, an object of the present invention is to provide improved fastening devices for locking bolt and nut members and the like against rotation.

Another object is to provide such fastening devices which are simple in construction, inexpensive to manufacture and highly effective in operation.

A further object consists in the construction of parts and arrangement of elements whereby the foregoing objects are accomplished.

Other and further objects will be obvious upon an understanding of the illustrative embodiment about to be described, or will be indicated in the appended claim, and various advantages not referred to herein will occur to one skilled in the art upon employment of the invention in practice.

In accordance with the invention, the foregoing objects are accomplished by forming the bolt head or nut with a tapered or frusto-conical surface and forming the annular member with a similarly shaped cooperating elliptical surface whereby a wedging action between the bolt head or nut and the annular member is provided which increases the effectiveness of the locking or fastening action of these elements. The annular member is further improved by rendering the same somewhat resilient to increase its grip on the bolt head or nut.

In the accompanying drawings:

Figure 1 is an elevational view of a pair of cutting shears, the blades of which are adjustably secured for relative movement by a fastening device in accordance with the present invention.

Figure 2 is a fragmentary exploded perspective view of the shears and the fastening device.

Figure 3 is a sectional view of the elements shown in Figure 2 prior to being assembled.

Figure 4 is a sectional view of the elements shown in assembled relation, taken along the line 4—4 on Figure 1.

Figure 5 is a sectional view similar to Figure 4, taken along the line 5—5 on Figure 1.

Figure 6 is an enlarged end view, in elevation, of the annular member.

Figure 7 is a fragmentary sectional view taken along the minor axis of the annular member (line 7—7 on Figure 6), and illustrating the elements cooperating with the annular member.

Figure 8 is a fragmentary sectional view similar to Figure 7 but taken along the major axis of the annular member (line 8—8 on Figure 6).

Figure 9 is a fragmentary exploded perspective view illustrating a modified embodiment of the invention.

Figure 10 is a sectional view of the elements shown in Figure 9 in assembled relation.

Figure 11 is a sectional view taken along the line 11—11 on Figure 10.

Figure 12 is an enlarged end view, in elevation, of the modified annular member illustrated in Figures 9 to 11, inclusive.

Referring to the drawings, and more particularly to Figures 1 to 8 thereof, there is shown a fastening device in accordance with the invention, illustrated by way of example as serving to adjustably secure the blades of a pair of cutting shears for relative movement.

The shears may be of conventional construction having blades 10 and 11 formed with handles 12 and 14, respectively, and being pivotally connected at 15 (Figure 1) by a fastening device about to be described. In order to accommodate the fastening device, the blade 10 is formed with a circular aperture 16, having a counterbore 17, and the blade 11 is formed with an elongated slot or aperture 18 having non-circular or flat sides 19 and arcuate ends 20 (Figure 2), the distance between the ends being slightly greater than the diameter of the aperture 16. The purpose of the aperture 16 and the slot 18, as will become apparent hereinafter, is to mount the blade 10 for rotation about the fastening device and to fix the blade 11 against rotation with respect to the fastening device.

The fastening device comprises a pair of cooperating screw threaded members 21 and 22, and an annular member 24 for locking the members 21 and 22 against relative rotation. As shown in Figures 2 to 8, the member 21 is the female screw element and the member 22 is the male screw element of a nut and screw arrangement.

The member 21 is in the form of a pivot pin comprising a head 25 adapted to be disposed in the counterbore 17 (Figures 3 to 5), and a generally cylindrical internally screw threaded shank 26 for pivotally mounting the blade 10 and having non-circular or flat sides 27 constructed and arranged to extend into the slot 18 of the blade 11 and arbor the blade on the member 21.

The member 22 is in the form of a screw comprising a head 29 formed with a tapered or frusto-conical side 30 and a slot 31 for the reception of a tool or the like, and an externally screw-threaded shank 32 cooperating with the internal threads of the member 21.

The annular member 24 may be formed of sheet metal and comprises a circular centrally apertured base or shoulder portion 34, a pair of diametrically opposite fingers 35 extending from the inner edge of the base 34, and a rim 36 extending from the outer edge of the base portion in the opposite direction of the fingers 35. The inner surface of the rim is elliptical and generally frusto-conical, as shown more particularly in Figure 6, and is somewhat resilient or flexible to enable the rim to assume a generally circular shape when the screw head 29 is forced into engagement therewith. In order to increase the resilience of the annular member 24, the base portion 34 may be notched or recessed at one or more points along the inner edge, as indicated at 37 (Figures 2 and 3).

In assembling the fastening device just described (Figures 3 to 8), the shank 26 of the member 21 is inserted through the aperture 16 of the blade 10 and the head 25 thereof is disposed in the counter-bore 17. The free end of the shank 26 is inserted into the slot 18 of the blade 11, with the flat sides 27 of the shank engaging the flat sides 19 of the slot and the arcuate ends 20 of the slot 18 being spaced from adjacent shank portions.

The fingers 35 of the member 24 are then inserted into the spaces provided between the arcuate ends 20 and the shank 26, as aforementioned, with one side of the base 34 abutting the outer side of the shear blade 11 (Figure 4), whereby the member 24 is retained against rotation with respect to the shear blade 11 and the member 21.

The member 22 is then inserted through the central aperture of the base 34 and its shank 32 is threaded into the threaded bore of the shank 26. As the members 21 and 22 are screwed together, the tapered head 29 readily engages the rim 36.

By reason of the elliptical shape of the rim and the dimensions of the tapered portions of the rim and head, the head tends to distort the rim from an elliptical shape (Figure 6) to a generally circular shape. For example, as shown in Figures 7 and 8, the distance across the rim at minor and major axes, respectively, can be increased and decreased respectively, from the full line positions to the broken line positions.

The head 29 exerts an end thrust on the rim, which due to its resilience yieldably tensions the blades 10 and 11 together. The amount of tension applied between the blades can be readily regulated by adjusting the extent the head 29 is forced into the rim 36.

An important advantage of the present fastening device is that manufacturing variances in the tapered portions do not adversely affect the operation of the device whereby close tolerances need not be observed. Also, the tapered portions enable the blades to be adjusted over a wide range of varying tension.

Referring to Figures 9 to 12 of the drawings, there is shown a modified embodiment of the present invention, wherein parts identical to those illustrated in Figures 1 to 8 have the same reference numerals applied thereto. A portion of a pair of shears is shown comprising blades 10 and 11 formed with apertures 16 and 18, respectively, for reception of the fastening device. The aperture 18, like in the previously described embodiment, has flat sides 19 and arcuate ends 20 (Figure 9).

The modified fastening device comprises a pair of cooperating screw threaded members 41 and 42 and an annular member 44 for locking the members 41 and 42 against relative rotation. As shown, the member 41 is the male screw element and the member 42 is the female screw element of a nut and screw arrangement.

The member 41 is in the form of a pivot pin comprising a head 45 and a generally cylindrical shank 46, externally screw threaded adjacent the free end thereof and formed with non-circular or flat sides 47 constructed and arranged to extend through the apertures 16 and 18 and arbor the blade 11 on the member 41. The blade 10 is adapted to be pivotally mounted on the member 41 adjacent the head 45.

The member 42 is in the form of a nut having a head 49 constructed to be engaged by a tool or the like and being internally screw threaded for cooperation with the screw threads of the shank 46. The nut has a tapered or frusto-conical portion 50 at one end thereof, the function of which will be described hereinafter.

The annular member 44 (Figure 12) is in the form of a washer-like element, preferably formed of sheet metal, and has a centrally apertured base or shoulder portion 54 formed with a pair of diametrically opposite non-circular or straight portions 55 at the inner edge thereof for engaging the side portions 47 of the shank 46. The base 54 is further formed with a rim 56 extending from the outer edge thereof, the inner surface of which is elliptical and generally frusto-conical. This rim is somewhat resilient or flexible and is adapted to be formed into a generally circular shape when engaged by the portion 50. The resilience of the annular member may be increased by forming a notch or recess 57 at the inner edge of the base portion intermediate the portions 55.

In assembling the fastening device just described (Figures 10 and 11), the shank 46 of the member 41 is inserted through the apertures 16 and 18 of the blades 10 and 11, respectively, with the head 45 engaging the outer side of the blade 10 and the flat sides 47 of the shank in registry with the flat sides 19 of the aperture 18 to arbor the blade 11 and member 45.

The annular member 44 is then mounted on the free end of the shank, which extends through the aperture 18, with the straight portions 55 of the base 54 in registry with the flat sides 47 of the shank and the base or shoulder 54 abutting the outer side of the shear blade 11, whereby the member 44 is retained against rotation with respect to the blade 11 and the member 44.

The nut member 42 is then screwed on the shank 46 to draw the frusto-conical portion 50 into the rim 56 and tension the blades together and lock the nut member 42 on the shank to accomplish the advantages described in connection with the embodiment shown in Figures 1 to 8.

A further advantage of the modified annular member is that it is extremely simple and can be readily manufactured by automatic machinery in a minimum number of operations and from a small amount of material.

While the fastening devices of the present invention have been illustrated and described in connection with shears by way of example, it will be readily understood that the same may be applied to other devices than shears, wherein a rotative member requires adjustment and then is to be held permanently in such adjusted position.

From the foregoing description, it will be seen that the present invention provides improved fastening devices for relatively rotatable members which are adjustably tensioned as described herein. The devices are simple in construction, economical to manufacture, easy to assemble, and are effective and practical in operation. The devices are rugged in construction and are adapted to remain in adjustment upon being subject to rough usage.

As various changes may be made in the form, construction and arrangement of parts herein, without departing from the spirit and scope of the invention and without sacrificing any of its advantages, it is to be understood that all matters herein are to be interpreted as illustrative and not in any limiting sense.

What I claim is:

In combination, a pair of relatively rotatable members each having an aperture therein one of which has a pair of non-circular surfaces, a pivot member having a shank extending into said apertures formed with screw threads and a pair of external non-circular surfaces for engaging said non-circular surfaces of said aperture, said shank and said aperture with said surfaces being constructed and arranged to provide a pair of spaces intermediate said surfaces, a screw member secured to said pivot member having a frusto-conical head, and an annular member having a shoulder portion formed with a pair of fingers extending into said spaces and being formed with an elliptical frusto-conical rim of continuous periphery engaged by said head.

CHARLES J. DALLEY.

References Cited in the file of this patent

UNITED STATES PATENTS

| Number | Name | Date |
|---|---|---|
| 620,999 | Wambsgans | Mar. 14, 1899 |
| 769,199 | Tower | Sept. 6, 1904 |
| 938,932 | Woodruff | Nov. 2, 1909 |
| 995,090 | Piper | June 13, 1911 |
| 1,814,821 | Botts | July 14, 1931 |
| 2,238,014 | Dalley | Apr. 8, 1941 |
| 2,524,652 | Dalley | Oct. 3, 1950 |